March 18, 1952 R. H. HILL 2,590,012
FLUID PRESSURE CLUTCH-ACTUATING MEANS FOR MOTOR VEHICLES
Filed March 4, 1949 3 Sheets-Sheet 3
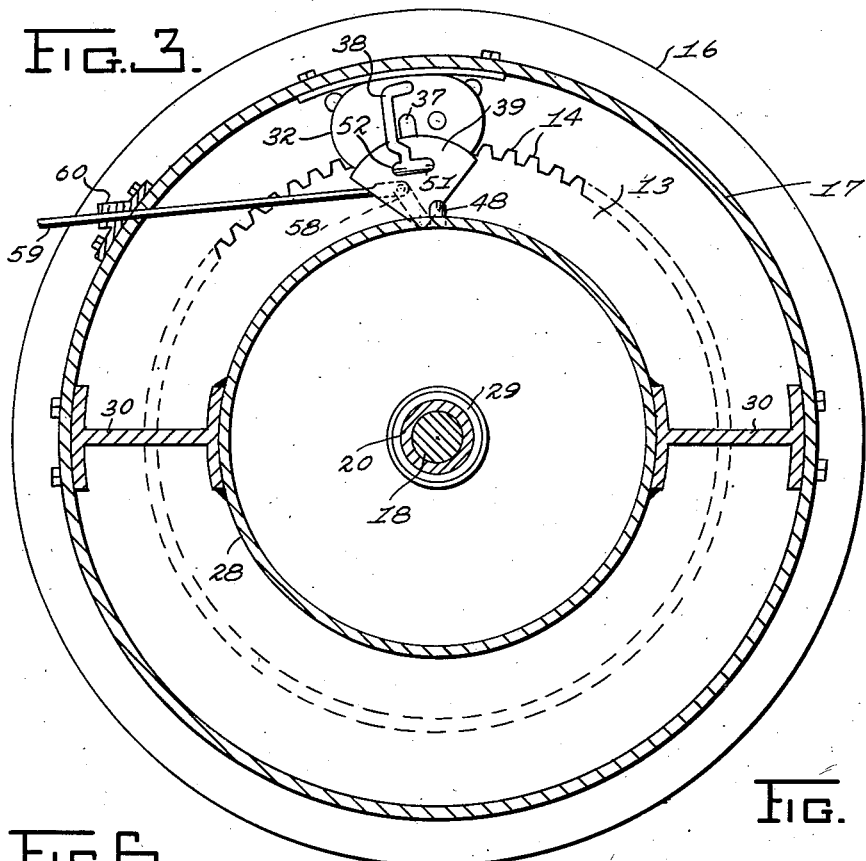
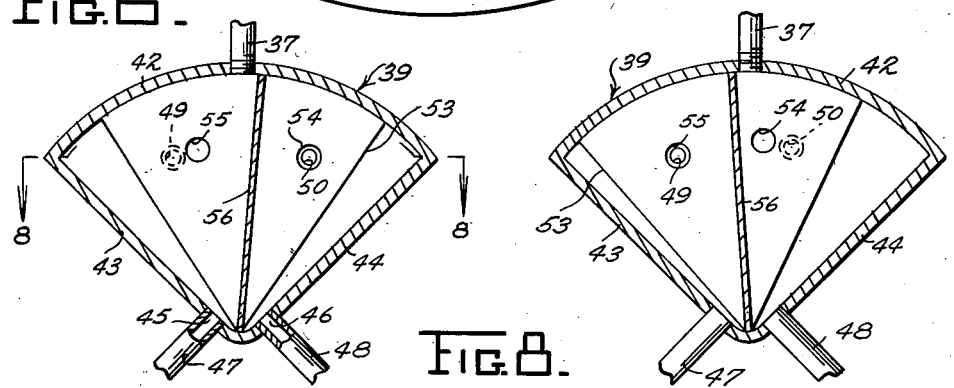
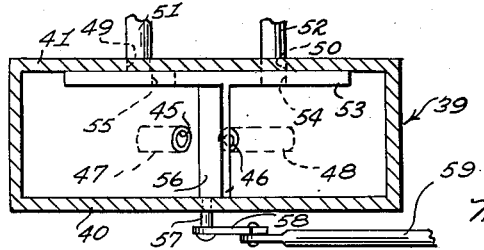
INVENTOR.
RALPH H. HILL
BY
McMorrow, Berman + Davidson
ATTORNEYS Patented Mar. 18, 1952

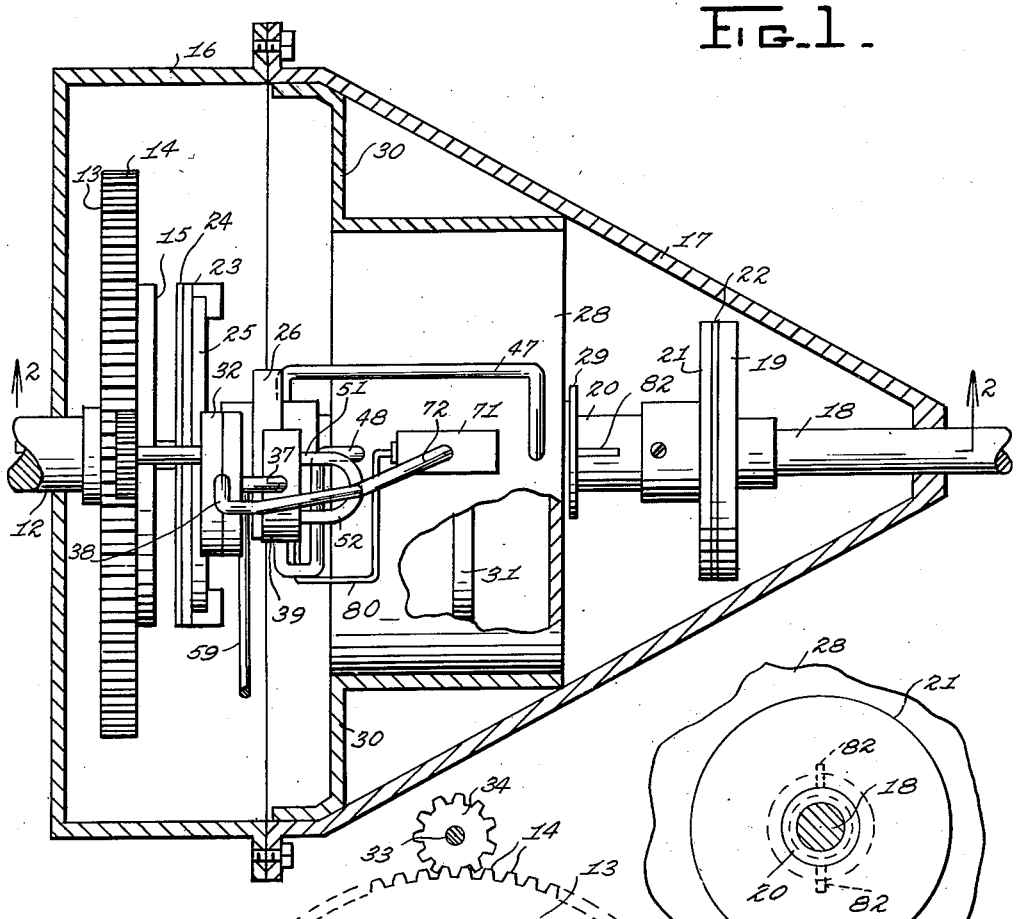

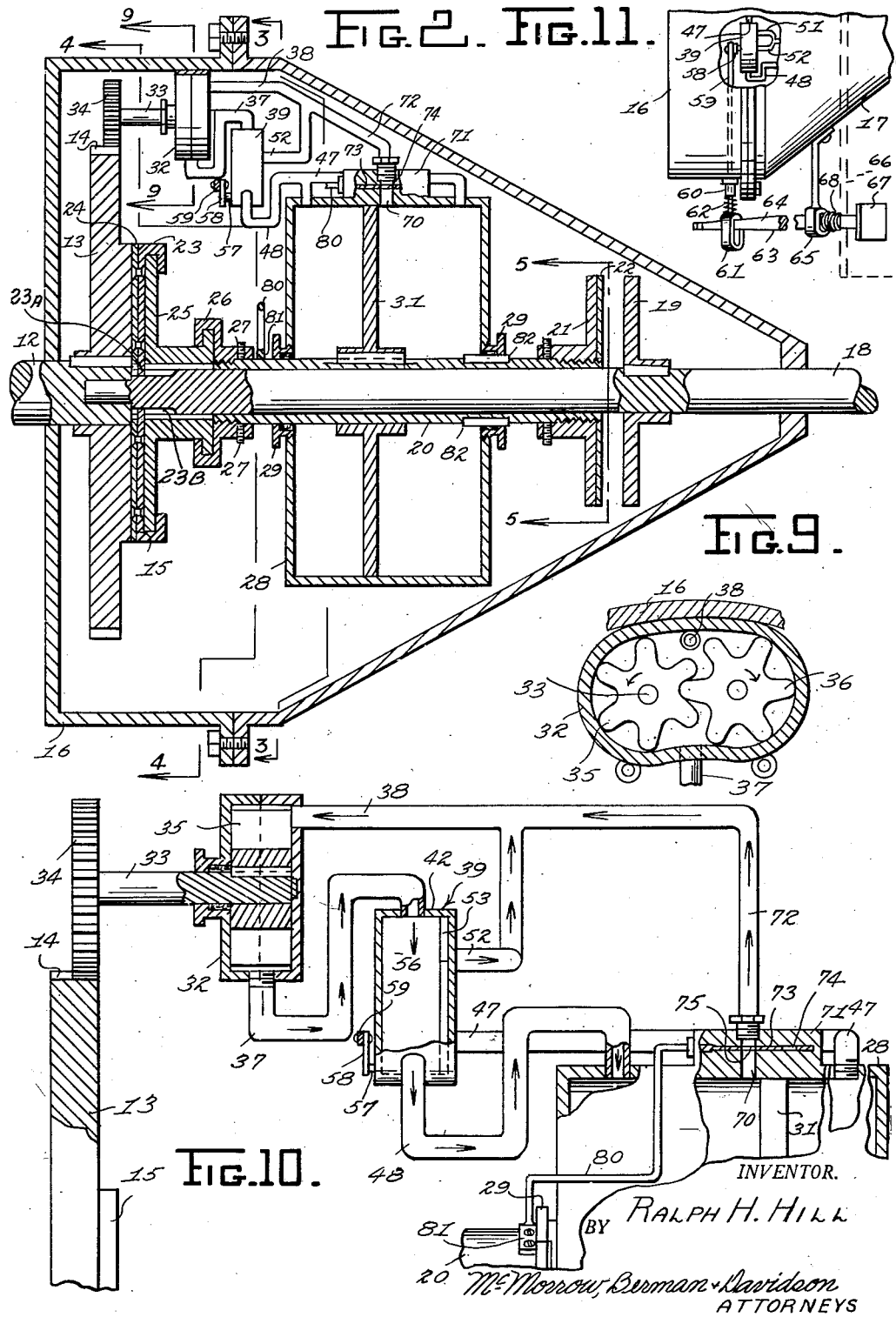

2,590,012

UNITED STATES PATENT OFFICE 2,590,012

FLUID PRESSURE CLUTCH-ACTUATING MEANS FOR MOTOR VEHICLES

Ralph H. Hill, Flint, Mich.

Application March 4, 1949, Serial No. 79,654

3 Claims. (Cl. 192—12)

Conventional motor vehicles include a drive shaft directly coupled to the prime mover for the vehicle and adapted to be coupled and uncoupled to a driven shaft by a clutch, the driven shaft being indirectly connected to the running gear for the vehicle through a speed-changing transmission. Such clutches are conventionally normally engaged to couple the driving and driven shafts by spring pressure, and disengaged by foot pressure on a pedal operatively connected to a movable element of the clutch.

With the foregoing in view, it is an object of my invention to provide fluid pressure means for moving the movable element of the clutch into and out of engagement with the other clutch element.

A further object is to provide in a device such as that last described a brake operatively connected to the movable clutch element and movable therewith into engagement with a second brake element fixed to the driven shaft, whereby to stop rotation of the driven shaft upon disengagement of the movable element of the clutch from the other clutch element.

A further object is to provide in a fluid pressure, clutch-actuating device for a motor vehicle a control valve for the fluid pressure device of novel construction and arrangement.

Other objects and advantages reside in the particular structure of the device, the structure of the several elements forming the same, combinations and sub-combinations of such elements, all of which will be readily apparent to those skilled in the art upon reference to the attached drawings in connection with the following specification, wherein the invention is shown, described and claimed.

In the drawings:

Figure 1 is a horizontal sectional view through a housing for the device according to the invention, showing the device according to the invention in plan, parts being broken away and shown in horizontal section;

Figure 2 is a longitudinal vertical sectional view taken substantially on the plane of the line 2—2 of Figure 1;

Figure 3 is a transverse vertical sectional view taken substantially on the planes of the line 3—3 of Figure 2;

Figure 4 is a transverse vertical sectional view taken substantially on the planes of the line 4—4 of Figure 2, the housing being omitted;

Figure 5 is a fragmentary transverse vertical sectional view taken substantially on the plane of the line 5—5 of Figure 2;

Figure 6 is a transverse vertical sectional view on an enlarged scale and taken through a control valve for the device and showing the parts in one position;

Figure 7 is a view like Figure 6, but showing the parts in an opposite position;

Figure 8 is a horizontal sectional view taken substantially on the plane of the line 8—8 of Figure 6;

Figure 9 is an enlarged transverse vertical sectional view of a pump for use with the device and taken substantially on the plane of the line 9—9 of Figure 2;

Figure 10 is a view similar to Figure 2, but on an enlarged scale and showing the parts in a different position, parts being broken away and omitted;

Figure 11 is a fragmentary plan view of the housing showing operating means for the valve.

Referring specifically to the drawings, wherein like reference characters have been used throughout the several views to designate like parts, 12 designates a drive shaft which is directly coupled to the prime mover for a motor vehicle. The drive shaft 12 has a flywheel 13 fixed to the rear end thereof, said flywheel being formed with a toothed periphery 14 so as to provide a spur gear. The rear end surface of the flywheel 13 is formed to provide a clutch element 15. The flywheel 13 is enclosed by a substantially cylindrical housing 16 which in turn is connected to a substantially conical housing 17, the apex of which is journaled on a driven shaft 18. The driven shaft 18 has a brake disc 19 fixed thereon in any suitable manner in the region of the apex of the conical portion 17 of the housing. A sleeve 20 is slidably journaled on the driven shaft 18 forwardly of the brake element 19. The rear end of the sleeve 20 has threaded thereon a brake element 21 having a rear surface lined with brake material 22.

A clutch element 23 is slidably connected to the driven shaft 18 by means of a key 23a which is carried by the clutch element 23 and which is slidably received within a keyway 23b formed in the driven shaft 18. The clutch element 23 is provided with a friction face 24 which is engageable with the fixed clutch element 15, the clutch element 23 being operatively connected to a pressure plate 25 in any suitable or well known manner. In turn, the pressure plate is journaled in a collar 26 which is threaded on the sleeve 20 and locked thereon by any suitable means, such as the set screws 27. The threaded connection between the brake 21 and collar 26 with sleeve 20 permit wear take-up adjustments of the clutch and brake elements. The arrangement of the parts is such that with the clutch element 23 operatively engaged with the clutch element 15, the brake elements 19 and 21 are disengaged. Likewise, when the brake elements 19 and 21 are engaged, the clutch elements 23 and 15 are disengaged. Thus, when the clutch elements are disengaged to permit the shifting of gears, not shown, the brake elements 19 and 21 are effective to stop rotation of the driven shaft 18 during the gear-shifting operation. At the same time, upon re-engagement of the clutch elements, the brake elements are released to free the driven shaft for rotation.

The cylinder 28 is slidably journaled on the sleeve 20 by any suitable keys 82 and combined bearings and stuffing boxes 29. However, the cylinder 28 is fixed against movement by being rigidly connected to the housing 17 by any suitable supports 30. A disc-like piston 31 is fixed to the sleeve 20 inwardly of the cylinder 28 for reciprocating movement relative to the cylinder. The piston 31 is adapted to be reciprocated in the cylinder 28 by any suitable fluid pressure means supplied thereto from any suitable source of fluid under pressure. In practice, the fluid may be gaseous or liquid, but in the embodiment illustrated comprises a liquid. However, it is to be understood that a gaseous fluid under pressure may be readily substituted if desired.

Any suitable fluid pump, such as the gear pump 32, is fixedly mounted inwardly of the housing 16 in any suitable manner. The pump 32 includes a driven shaft 33 having a pinion 34 fixed to the free end thereof. The pinion 34 is in constant mesh with the teeth 14 of the flywheel 13, whereby to be driven thereby. The pump 32 is provided with an outlet port 37 and an intake port 38, and, with the impellers 35 and 36 rotating in the direction of the arrows, Figure 9, fluid is drawn into the casing of the pump through the intake port 38 and forced out of the pump through the outlet port 37. Thus, fluid under pressure is supplied to a control valve 39 through an outlet conduit 37.

The control valve 39 is best seen in Figures 6, 7 and 8, and comprises a hollow casing of segmental form having a segmental front wall 40, a similarly-shaped rear wall 41, which walls are connected together by an arcuate top wall 42 and a pair of downwardly-converging end walls 43 and 44. The outlet conduit 37 opens into the valve casing 39 through the top wall 42 centrally of the latter. The end walls 43 and 44 are each provided with a combined intake and outlet port 45 and 46, respectively, which open into outlet and inlet conduits 47 and 48. The rear wall 41 is formed with a pair of laterally-spaced outlet ports 49 and 50 which open into outlet conduits 51 and 52 comprising branch conduits of the conduit 38 aforesaid. A segmental valve plate 53 bears against the rear wall 41 and is oscillatable thereon. The valve plate 53 is formed with a pair of outlet ports 54 and 55 which are so spaced as to be alternately registrable with corresponding outlet ports 50 and 49 with the plate 53 in opposite positions. That is to say, with the plate 53 in the position of Figure 6, the outlet port 54 thereof is registered with the outlet port 50, while the outlet port 55 is out of registry with the outlet port 49. Likewise, with the plate 53 in the opposite position, as shown in Figure 7, the ports 55 and 49 are registered, while the ports 50 and 54 are out of registry. A partition 56 is fixed to the plate 53 and extends radially thereof so as to divide the valve casing into two compartments. Also, the partition 56 is so disposed as to be positioned on opposite sides of the intake port for the conduit 37 in opposite positions of the plate. Thus, in Figure 6, the partition 56 is to the right of the intake conduit 37, whereby fluid under pressure enters the valve casing and is discharged therefrom through the port 45 and outlet conduit 47. Meanwhile, return fluid from the cylinder 28 enters the valve casing through the inlet conduit 48, port 46 and discharges therefrom through the exhaust ports 54 and 50 which are in registry, whereby to be returned to the pump through the branch conduit 52 and the conduit 38. Obviously, with the parts in the Figure 7 position, the reverse is true; whereby hydraulic fluid under pressure is supplied to the opposite end of the cylinder 28 and exhausted in a similar manner through the valve 39. The valve plate 53 had fixed thereto adjacent the apex thereof a spindle 57 to which is fixed a crank arm 58. The crank arm 58 and spindle 57 comprise means for moving the plate 53 to and from the Figures 6 and 7 positions.

The means for rocking the crank arm 58 is best seen in Figure 11, and comprises a push-pull rod 59 pivoted to the free end of the crank arm. The rod 59 extends laterally through the housing 16 being slidably supported in any suitable fixed sleeve or slideway 60. The free end of the rod 59 is disposed outwardly of the housing 16 and formed to provide an elongated eye 61. An expansive spring 62 is interposed between the sleeve 60 and the eye 61, whereby to load the rod 59 and the valve plate 53 to one position. An upwardly-directed push rod 63 extends through the eye 61 and includes a cam surface 64 bearing against the inner end of the eye. The rod 63 is supported in any suitable guide 65 fixed to the housing 17. The upper end of the rod 63 extends through the floor boards 66 into the driver's compartment of the automobile. The free upper end of such rod is formed with any suitable pedal 67. An expansive spring 68 is interposed between the guide 65 and the floor board 66, whereby to load the rod 63 to its uppermost position. This arrangement permits the spring 62 to retract the push-pull rod 59 whereby the valve plate 53 is maintained in a normal extreme position. Normally, this position will be in the position wherein the clutches 23 and 15 are engaged, as shown in Figure 2. Obviously, upon depression of the pedal 67, the cam surface 64 will push the rod 59 so as to rock the crank lever 58 and move the valve plate 53 to the other extreme position wherein the clutches will be disengaged, as shown in Figure 1.

To relieve the cylinder 28 of excessive pressures after the piston 31 has been actuated in either direction, means now to be described have been provided. Thus, the cylinder 28 is provided with a by-pass port 70 which opens into the cylinder intermediate the end walls thereof. The by-pass port 70 opens through a valve chest 71 into a return conduit 72 comprising a branch of the return conduit 38 aforesaid. A slide valve 73, best seen in Figure 10, is slidable in the valve chest 71 in parallel relation to the driven shaft 18. The slide valve 73 is formed with a pair of spaced ports 74 and 75 which are alternately registrable with the by-pass port 70 with the piston 31 in opposite positions. Thus, with the piston 31 in the clutch-engaging position of Figure 2, the port 74 is registered with the port 70 so as to permit by-pass circulation of fluid entering the right-hand end of the cylinder 28 through the conduit 47 back to the pump 32 through the branch conduit 72 and return conduit 38. On the other hand, when the parts are in the clutch-disengaging position shown in Figures 1 and 10, the by-pass port 70 is registered with the port 75 of the slide valve 73, whereby to provide a by-pass circulation through the branch conduit 72 as aforesaid. Thus, in either position of the piston 31, excessive pressures on the working side of the piston are relieved by the by-pass circuit just described. Actuation of the slide valve 73 is accomplished by the operating rod 80 extending outwardly of the valve chest 71 and having a free end rigidly secured to the sleeve 20, as at 81. Thus, the valve 73 is slid back and forth with the sleeve as the same is moved to and from the clutch-engaging position.

While I have shown and described what is now thought to be a preferred embodiment of the invention, it is to be understood that the same is susceptible of other forms and expressions. Consequently, I do not limit myself to the precise structure shown and described hereinabove except as hereinafter claimed.

I claim:

1. In a motor vehicle including a drive shaft, a driven shaft driven by said drive shaft, a driving clutch element on said drive shaft, and a driven clutch slidable on said driven shaft into and out of engagement with said driving clutch element whereby to couple said shafts together, the improvement comprising a sleeve slidably journaled on said driven shaft, said sleeve having a front end operatively connected to said driven clutch element for actuating the latter, said sleeve having a rear end having a first brake element fixed thereto, a second brake element fixed to said driven shaft for operative engagement with said first brake element upon sliding movement of said sleeve in a clutch-disengaging direction, a piston fixed to said sleeve concentrically thereof between said first brake element and said driven clutch element, a fixed cylinder surrounding said piston and adjacent portions of said sleeve, a source of fluid under pressure, and valve means for selectively supplying said fluid to opposite sides of said piston whereby to actuate the latter to engage and disengage said clutch and brake elements.

2. In a motor vehicle including a drive shaft, a driven shaft driven by said drive shaft, a driving clutch element on said drive shaft, and a driven clutch slidable on said driven shaft into and out of engagement with said driving clutch element whereby to couple said shafts together, the improvement comprising a sleeve slidably journaled on said driven shaft, said sleeve having a front end operatively connected to said driven clutch element for actuating the latter, said sleeve having a rear end having a first brake element fixed thereto, a second brake element fixed to said driven shaft for operative engagement with said first brake element upon sliding movement of said sleeve in a clutch-disengaging direction, a piston fixed to said sleeve concentrically thereof between said first brake element and said driven clutch element, a fixed cylinder surrounding said piston and adjacent portions of said sleeve, a fluid pump, means operatively coupling said pump to said drive shaft for actuation thereby, a closed fluid circuit operatively connecting said pump to said cylinder, and a manually-controlled valve in said circuit for selectively directing fluid to opposite sides of said piston whereby to actuate the latter to engage and disengage said clutch and brake elements.

3. In a motor vehicle including a drive shaft, a driven shaft driven by said drive shaft, a driving clutch element on said drive shaft, and a driven clutch slidable on said driven shaft into and out of engagement with said driving clutch element whereby to couple said shafts together, the improvement comprising a sleeve slidably journaled on said driven shaft, said sleeve having a front end operatively connected to said driven clutch element for actuating the latter, said sleeve having a rear end having a first brake element fixed thereto, a second brake element fixed to said driven shaft for operative engagement with said first brake element upon sliding movement of said sleeve in a clutch-disengaging direction, a piston fixed to said sleeve concentrically thereof between said first brake element and said driven clutch element, a fixed cylinder surrounding said piston and adjacent portions of said sleeve, a fluid pump, means operatively coupling said pump to said drive shaft for actuation thereby, a closed fluid circuit operatively connecting said pump to said cylinder, a manually-controlled valve in said circuit for selectively directing fluid to opposite sides of said piston whereby to actuate the latter to engage and disengage said clutch and brake elements, said cylinder being formed with a fluid by-pass port centrally thereof, and in operative association with said fluid circuit, a slide valve on said cylinder for opening and closing said by-pass port, actuating means for said slide valve, means operatively connecting said actuating means for said slide valve to said sleeve for actuation thereby, whereby said slide valve is automatically opened immediately after the engagement of each of said clutch and brake elements.

RALPH H. HILL.

REFERENCES CITED

The following references are of record in the file of this patent:

UNITED STATES PATENTS

| Number | Name | Date |
|---|---|---|
| 1,425,086 | Geer | Aug. 8, 1922 |
| 2,193,068 | Feck | Mar. 12, 1940 |
| 2,213,111 | Strout | Aug. 27, 1940 |
| 2,249,508 | Warner | July 15, 1941 |